US008522349B2

(12) United States Patent
Crume

(10) Patent No.: US 8,522,349 B2
(45) Date of Patent: Aug. 27, 2013

(54) DETECTING AND DEFENDING AGAINST MAN-IN-THE-MIDDLE ATTACKS

(75) Inventor: Jeffrey L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/432,956

(22) Filed: Mar. 28, 2012

(65) Prior Publication Data

US 2012/0185938 A1 Jul. 19, 2012

Related U.S. Application Data

(63) Continuation of application No. 11/753,673, filed on May 25, 2007.

(51) Int. Cl.
*G06F 11/00* (2006.01)
(52) U.S. Cl.
USPC ........ 726/23; 726/3; 726/13; 726/26; 726/34; 713/170; 713/176; 713/177; 709/220; 709/230; 705/51
(58) Field of Classification Search
USPC .......................... 726/22–23, 13, 27; 713/131
See application file for complete search history.

(56) References Cited

U.S. PATENT DOCUMENTS

| 4,310,720 | A | 1/1982 | Check, Jr. |
|---|---|---|---|
| 5,046,082 | A | 9/1991 | Zicker et al. |
| 5,068,894 | A | 11/1991 | Hoppe |
| 5,323,465 | A | 6/1994 | Avarne |
| 5,457,737 | A | 10/1995 | Wen |
| 5,491,752 | A | 2/1996 | Kaufman et al. |
| 5,497,411 | A | 3/1996 | Pellerin |
| 5,647,388 | A | 7/1997 | Butler, Jr. et al. |
| 5,657,388 | A | 8/1997 | Weiss |
| 5,684,950 | A | 11/1997 | Dare et al. |
| 5,701,339 | A | 12/1997 | Suda |
| 5,749,052 | A | 5/1998 | Hidem et al. |
| 5,841,871 | A | 11/1998 | Pinkas |
| 5,842,124 | A | 11/1998 | Kenagy et al. |

(Continued)

FOREIGN PATENT DOCUMENTS

| DE | 10317176 | 11/2004 |
|---|---|---|
| EP | 1119147 A1 | 7/2001 |

(Continued)

OTHER PUBLICATIONS

Justin Ma, Beyond Blacklists, Jul. 2009, ACM, vol. 9 , pp. 1245-153.*

(Continued)

*Primary Examiner* — Nathan Flynn
*Assistant Examiner* — Viral Lakhia
(74) *Attorney, Agent, or Firm* — Douglas A. Lashmit; Hoffman Warnick LLC

(57) ABSTRACT

A system, method and program product for defending against man in the middle (MITM) attacks directed at a target server. A system is provided that includes an activity recording system that records an incoming IP address, userid, and time of each session occurring with the target server; an activity analysis system that identifies suspect IP addresses by determining if an unacceptable number of sessions are occurring from a single incoming IP address during a predefined time period; and a countermeasure system for taking action against suspect IP addresses.

22 Claims, 4 Drawing Sheets

(56) References Cited

U.S. PATENT DOCUMENTS

| | | | |
|---|---|---|---|
| 5,892,902 A | 4/1999 | Clark | |
| 5,953,422 A | 9/1999 | Angelo et al. | |
| 5,971,272 A | 10/1999 | Hsiao | |
| 6,000,031 A | 12/1999 | Bingaman et al. | |
| 6,169,890 B1 | 1/2001 | Vatanen | |
| 6,278,863 B1 | 8/2001 | Mabrouki | |
| 6,308,268 B1 | 10/2001 | Audebert | |
| 6,324,271 B1 | 11/2001 | Sawyer et al. | |
| 6,330,608 B1 | 12/2001 | Stiles | |
| 6,334,056 B1 | 12/2001 | Holmes et al. | |
| 6,338,140 B1 | 1/2002 | Owens et al. | |
| 6,349,134 B1 | 2/2002 | Katz | |
| 6,385,729 B1 | 5/2002 | DiGiorgio et al. | |
| 6,387,729 B2 | 5/2002 | Eng et al. | |
| 6,393,468 B1 | 5/2002 | McGee | |
| 6,400,726 B1 | 6/2002 | Piret et al. | |
| 6,466,780 B1 | 10/2002 | Geiselman et al. | |
| 6,535,726 B1 | 3/2003 | Johnson | |
| 6,584,309 B1 | 6/2003 | Whigham | |
| 6,687,241 B1 | 2/2004 | Goss | |
| 6,707,915 B1 | 3/2004 | Jobst et al. | |
| 6,731,731 B1 | 5/2004 | Ueshima | |
| 6,993,658 B1 | 1/2006 | Engberg et al. | |
| 6,993,663 B1 | 1/2006 | Paya et al. | |
| 7,007,301 B2 * | 2/2006 | Crosbie et al. | 726/23 |
| 7,024,688 B1 | 4/2006 | Faccin et al. | |
| 7,028,179 B2 | 4/2006 | Anderson et al. | |
| 7,058,796 B2 | 6/2006 | Lynn et al. | |
| 7,058,968 B2 | 6/2006 | Rowland et al. | |
| 7,100,204 B1 | 8/2006 | Myllymaki et al. | |
| 7,133,662 B2 | 11/2006 | Bravo et al. | |
| 7,142,840 B1 | 11/2006 | Geddes et al. | |
| 7,221,949 B2 | 5/2007 | Clough | |
| 7,290,278 B2 | 10/2007 | Cahill et al. | |
| 7,317,693 B1 * | 1/2008 | Roesch et al. | 370/252 |
| 7,324,976 B2 | 1/2008 | Gupta et al. | |
| 7,337,431 B1 | 2/2008 | Barnes et al. | |
| 7,357,310 B2 | 4/2008 | Calabrese et al. | |
| 7,360,248 B1 | 4/2008 | Kanevsky et al. | |
| 7,376,431 B2 | 5/2008 | Niedermeyer | |
| 7,379,921 B1 | 5/2008 | Kiliccote | |
| 7,380,708 B1 | 6/2008 | Kiliccote | |
| 7,447,494 B2 | 11/2008 | Law et al. | |
| 7,480,805 B1 | 1/2009 | Gnech et al. | |
| 7,491,308 B2 | 2/2009 | Talieh et al. | |
| 7,519,989 B2 | 4/2009 | Lin et al. | |
| 7,533,414 B1 | 5/2009 | Reed et al. | |
| 7,536,634 B2 | 5/2009 | Green et al. | |
| 7,540,022 B2 | 5/2009 | Barari et al. | |
| 7,594,270 B2 | 9/2009 | Church et al. | |
| 7,600,676 B1 | 10/2009 | Rados et al. | |
| 7,609,625 B2 | 10/2009 | Wei et al. | |
| 7,623,458 B2 | 11/2009 | Ayyagari et al. | |
| 7,624,447 B1 | 11/2009 | Horowitz et al. | |
| 7,665,128 B2 | 2/2010 | Yang | |
| 7,673,334 B2 | 3/2010 | Takemori et al. | |
| 7,715,823 B2 | 5/2010 | Bravo et al. | |
| 7,716,742 B1 | 5/2010 | Roesch et al. | |
| 7,757,285 B2 | 7/2010 | Kubota et al. | |
| 7,765,584 B2 | 7/2010 | Roskind | |
| 7,779,465 B2 | 8/2010 | Baker et al. | |
| 7,823,199 B1 | 10/2010 | Rathi et al. | |
| 7,840,993 B2 | 11/2010 | Ganesan et al. | |
| 7,845,004 B2 | 11/2010 | Bardsley et al. | |
| 7,886,346 B2 | 2/2011 | Sandhu et al. | |
| 7,926,108 B2 | 4/2011 | Rand et al. | |
| 7,930,540 B2 * | 4/2011 | Ahuja et al. | 713/167 |
| 7,954,150 B2 | 5/2011 | Croft et al. | |
| 7,975,293 B2 | 7/2011 | Yoshida et al. | |
| 8,019,995 B2 | 9/2011 | van Bemmel | |
| 8,024,567 B2 | 9/2011 | Han | |
| 8,050,658 B2 | 11/2011 | Hong | |
| 8,060,915 B2 | 11/2011 | Voice et al. | |
| 8,136,150 B2 | 3/2012 | Hayler et al. | |
| 8,150,370 B2 | 4/2012 | Dempo et al. | |
| 8,151,327 B2 | 4/2012 | Eisen | |
| 8,181,248 B2 | 5/2012 | Oh et al. | |
| 8,201,217 B1 | 6/2012 | Begen et al. | |
| 8,254,542 B2 | 8/2012 | Frederick | |
| 8,281,375 B2 | 10/2012 | Von Krogh | |
| 8,285,639 B2 | 10/2012 | Eden et al. | |
| 8,296,823 B2 | 10/2012 | Schubert | |
| 8,301,877 B2 | 10/2012 | Grajek et al. | |
| 8,302,180 B1 * | 10/2012 | Gudov et al. | 726/13 |
| 8,302,187 B1 | 10/2012 | Gupta et al. | |
| 2001/0054155 A1 | 12/2001 | Hagan et al. | |
| 2002/0069165 A1 | 6/2002 | O'Neil | |
| 2002/0091931 A1 | 7/2002 | Quick et al. | |
| 2002/0095588 A1 | 7/2002 | Shigematsu et al. | |
| 2002/0178070 A1 | 11/2002 | Leveridge | |
| 2002/0178370 A1 | 11/2002 | Gurevich et al. | |
| 2003/0014315 A1 | 1/2003 | Jaalinoja et al. | |
| 2003/0154382 A1 | 8/2003 | Vicard | |
| 2003/0172272 A1 | 9/2003 | Ehlers et al. | |
| 2004/0148520 A1 * | 7/2004 | Talpade et al. | 713/201 |
| 2004/0152446 A1 | 8/2004 | Saunders et al. | |
| 2004/0198329 A1 | 10/2004 | Vasa | |
| 2005/0015624 A1 * | 1/2005 | Ginter et al. | 713/201 |
| 2005/0018618 A1 | 1/2005 | Mualem et al. | |
| 2005/0022020 A1 | 1/2005 | Fremberg | |
| 2005/0060535 A1 | 3/2005 | Bartas | |
| 2005/0075070 A1 | 4/2005 | Crilly, Jr. | |
| 2005/0182958 A1 | 8/2005 | Pham et al. | |
| 2005/0187934 A1 | 8/2005 | Motsinger et al. | |
| 2005/0188423 A1 | 8/2005 | Motsinger et al. | |
| 2005/0210251 A1 | 9/2005 | Nyberg et al. | |
| 2006/0021031 A1 * | 1/2006 | Leahy et al. | 726/22 |
| 2006/0036690 A1 | 2/2006 | O'Neil | |
| 2006/0094403 A1 | 5/2006 | Norefors et al. | |
| 2006/0095955 A1 | 5/2006 | Vong et al. | |
| 2006/0288411 A1 * | 12/2006 | Garg et al. | 726/22 |
| 2007/0015492 A1 | 1/2007 | Bravo et al. | |
| 2007/0067828 A1 | 3/2007 | Bychkov | |
| 2007/0083606 A1 * | 4/2007 | Malik et al. | 709/207 |
| 2007/0084913 A1 | 4/2007 | Weston | |
| 2007/0107050 A1 | 5/2007 | Selvarajan | |
| 2007/0136573 A1 | 6/2007 | Steinberg | |
| 2007/0136808 A1 | 6/2007 | Xiong | |
| 2007/0143851 A1 | 6/2007 | Nicodemus et al. | |
| 2007/0186099 A1 | 8/2007 | Beck et al. | |
| 2007/0234426 A1 * | 10/2007 | Khanolkar et al. | 726/23 |
| 2007/0261112 A1 * | 11/2007 | Todd et al. | 726/11 |
| 2007/0266257 A1 | 11/2007 | Camaisa et al. | |
| 2008/0028447 A1 | 1/2008 | O'Malley et al. | |
| 2008/0172730 A1 | 7/2008 | Sandhu et al. | |
| 2008/0181380 A1 | 7/2008 | Gustave et al. | |
| 2008/0189776 A1 | 8/2008 | Constable | |
| 2008/0209275 A1 | 8/2008 | Kwan et al. | |
| 2008/0270301 A1 | 10/2008 | Jones et al. | |
| 2008/0281737 A1 | 11/2008 | Fajardo | |
| 2008/0318548 A1 | 12/2008 | Bravo et al. | |
| 2009/0037329 A1 | 2/2009 | Coppinger et al. | |
| 2009/0077637 A1 | 3/2009 | Santos et al. | |
| 2009/0094682 A1 | 4/2009 | Sage et al. | |
| 2009/0095588 A1 | 4/2009 | Thomas | |
| 2009/0104889 A1 | 4/2009 | Lotvonen et al. | |
| 2009/0106138 A1 | 4/2009 | Smith et al. | |
| 2009/0300738 A1 | 12/2009 | Dewe et al. | |
| 2010/0024017 A1 | 1/2010 | Ashfield et al. | |
| 2010/0051686 A1 | 3/2010 | Obi | |
| 2010/0095351 A1 * | 4/2010 | Liu et al. | 726/3 |
| 2010/0269162 A1 | 10/2010 | Bravo et al. | |
| 2011/0015449 A1 | 1/2011 | Pendleton et al. | |
| 2011/0039237 A1 * | 2/2011 | Skare | 434/118 |
| 2011/0138483 A1 | 6/2011 | Bravo et al. | |
| 2011/0197070 A1 | 8/2011 | Mizrah | |
| 2011/0225647 A1 * | 9/2011 | Dilley et al. | 726/14 |
| 2011/0277024 A1 | 11/2011 | Begley et al. | |
| 2011/0289576 A1 | 11/2011 | Cheng | |
| 2012/0011066 A1 | 1/2012 | Telle et al. | |
| 2012/0149334 A1 | 6/2012 | Zhang et al. | |
| 2012/0204241 A1 | 8/2012 | Varsavsky et al. | |
| 2012/0264405 A1 | 10/2012 | Bravo et al. | |
| 2012/0272331 A1 * | 10/2012 | Lemaster et al. | 726/27 |

FOREIGN PATENT DOCUMENTS

| | | |
|---|---|---|
| GB | 2456509 A | 7/2009 |
| JP | 10334048 | 12/1998 |
| JP | 10341224 | 12/1998 |
| JP | 2001111545 | 4/2001 |
| WO | 0109808 A1 | 8/2001 |
| WO | 2004079499 A2 | 9/2004 |
| WO | 2006103387 A1 | 10/2006 |
| WO | 2008147353 A1 | 12/2008 |

OTHER PUBLICATIONS

U.S. Appl. No. 11/753,673, filed Mar. 25, 2007, Office Action dated Dec. 22, 2011.
U.S. Appl. No. 11/753,673, filed Mar. 25, 2007, Office Action dated Oct. 8, 2010.
U.S. Appl. No. 11/753,673, filed Mar. 25, 2007, Office Action dated Apr. 15, 2010.
Lee et al., "A Resilient Packet-Forwarding Scheme against Maliciously Packet-Dropping Nodes in Sensor Networks", ACM 2006.
Kaafar et al., "Real attacks on virtual networks: Vivaldi out of tune", ACM 2006.
Juels, Ari, "Strengthening EPC Tags Against Cloning", ACM 2005.
Deng et al., "Defending Against Redirect Attacks in Mobile IP", ACM 2002.
Lakhia, U.S. Appl. No. 11/753,673, Notice of Allowance, Jun. 18, 2012, 11 pages.
Gee, U.S. Appl. No. 13/084,823, Office Action, IBMC-0395, Mar. 11, 2013, 8 pages.
Leung, "Depress Phishing by CAPTCHA with OTP", Department of Information Engineering The Chinese University of Hong Kong, IEEE 2009, 6 pgs.
Kopsidas et al., "Voice Interactive Personalized Security (VoIPSEC) protocol: Fortify Internet telephony by providing end-to-end security through inbound key exchange and biometric verification", 2006 IEEE, 10 pgs.
Koo et al., "VoIP Interception in P2P SIP Environment", 2010 IEEEE, vol. 1, pp. 331-334.
Megeed, U.S. Appl. No. 12/423,928, Office Action 1, IBMC-0326, 21 pages, Aug. 25, 2011.
Megeed, U.S. Appl. No. 12/423,928, Final Office Action 1, IBMC-0326, 20 pages, Nov. 10, 2011.
Megeed, U.S. Appl. No. 12/423,928, Office Action 2, IBMC-0326, 20 pages, Jun. 8, 2012.
Megeed, U.S. Appl. No. 12/423,928, Notice of Allowance 1, IBMC-0326, 10 pages, Sep. 25, 2012.
Megeed, U.S. Appl. No. 12/423,928, Notice of Allowance 2, IBMC-0326, 19 pages, Dec. 4, 2012.
Bibbee, U.S. Appl. No. 11/765,193, Office Action 1, 15 pages, Feb. 18, 2010.
Bibbee, U.S. Appl. No. 11/765,193, Office Action 2, 14 pages, Nov. 29, 2010.
Bibbee, U.S. Appl. No. 11/765,193, Office Action 3, 18 pages, Sep. 19, 2011.
Bibbee, U.S. Appl. No. 11/765,193, Final Office Action 1, 15 pages, Jul. 30, 2010.
Bibbee, U.S. Appl. No. 11/765,193, Final Office Action 2, 17 pages, May 12, 2011.
Bibbee, U.S. Appl. No. 11/765,193, Final Office Action 3, 18 pages, Apr. 16, 2012.
Tran, U.S. Appl. No. 11/524,340, Office Action, 9 pages, Jul. 29, 2009.
Tran, U.S. Appl. No. 11/524,340, Office Action, 19 pages, Oct. 31, 2008.
Tran, U.S. Appl. No. 11/524,340, Notice of Allowance, 11 pages, Dec. 29, 2009.
Tran, U.S. Appl. No. 11/524,340, Office Action, 7 pages, Apr. 29, 2009.
Tran, U.S. Appl. No. 11/524,340, Office Action, 22 pages, May 27, 2008.
Alicherry et al., "DoubleCheck: Multi-ath Verification Against Man-in-the-Middle Attack", IEEE 2009, pp. 557-563.
Kumaraguru et al., "Getting Users to Pay Attention to Anti-Phishing Education: Evaluation of Retention and Transfer", APWG eCrime Researchers Summit, Oct. 4-5, 2007, Pittsburgh, PA pp. 70-81.
Adida, "BeamAuth: Two-Factor Web Authentication with a Bookmark", CCS '07, Oct. 29-Nov. 2, 2007, Alexandria, VA, ACM 978-1-59593-703-2/07/0010, pp. 48-57.
Nassar et al., "Holistic VoIP Intrusion Detection and Prevention System", IPTCOMM '07, ACM 2007, pp. 1-9.
Stoll et al., "Sesame: Informing User Security Decisions with System Visualization", CHI 2008 Proceedings, Am I Safe, Apr. 5-10, 2008, Florence, Italy, pp. 1045-1054.
Bonzo, U.S. Appl. No. 11/776,619, Notice of Allowance, Apr. 29, 2010, 10 pages.
Bonzo, U.S. Appl. No. 11/776,619, Office Action, Sep. 30, 2009, 12 pages.
"Prevent Online Banking Fraud", Dec. 7, 2010, http://www.phonefactor.com/products/transaction-verification, 1 pages.
Geneiatakis et al., "Survey of Security Vulnerabilities in Session Initiation Protocol", 3rd Quarter 2006, vol. 8, No. 3, IEEE Communications Surveys & Tutorials, pp. 68-81.
Almeida, U.S. Appl. No. 12/630,875, Office Action, IBMC-0353, Mar. 1, 2012, 17 pages.
Almeida, U.S. Appl. No. 12/630,875, Office Action, IBMC-0353, Aug. 30, 2012, 14 pages.
Almeida, U.S. Appl. No. 12/630,875, Notice of Allowance, IBMC-0353, Dec. 20, 2012, 7 pages.
Lakhia, U.S. Appl. No. 11/753,673, Office Action, Jan. 8, 2013, 14 pages.
Bibbee, U.S. Appl. No. 11/765,193, Examiner's Answer, RSW920070138US1, Apr. 16, 2013, 20 pages.
Almeida, U.S. Appl. No. 12/630,875, Office Action, Apr. 17, 2013, 40 pages.
Lakhia, U.S. Appl. No. 11/753,673, Notice of Allowance & Fees Due, dated May 10, 2013, 28 pages.

\* cited by examiner

DETECTING AND DEFENDING AGAINST MAN-IN-THE-MIDDLE ATTACKS

CROSS-REFERENCE TO RELATED APPLICATION

This Application is a continuation of currently pending U.S. patent application Ser. No. 11/753,673, which was filed on May 25, 2007 and is hereby incorporated by reference.

FIELD OF THE INVENTION

This disclosure relates generally to protecting the integrity of network communications, and more particularly to a system and method of detecting and defending against man-in-the-middle (MITM) attacks.

BACKGROUND

One of the most difficult network-based attacks to defend against is that of a class known as "man-in-the-middle" (MITM) attacks. These scenarios involve the insertion by an attacker of an untrusted node into a session path. This MITM attack node then impersonates the identity of one session partner to the other while having access to and control over all transmissions between the partners resulting in the potential for eavesdropping and unauthorized modification of session traffic. These attacks are particularly effective when combined with "phishing" techniques which trick an end user into giving up personal information that later results in identity theft or fraud.

FIG. 2 depicts an example of an MITM attack, in which a plurality of users 50 are unsuspectingly engaged in sessions with an MITM Web server 52, which sits between users 50 and the legitimate target Web server 54. In this case, MITM Web server 52 has lured users 50 into believing that they are engaging in a session with the target Web server 54.

Banks and other financial institutions have been particularly hard hit by these attacks as customers are lured into logging onto a malicious MITM node thinking they are connecting to their bank, while the MITM node interacts with the legitimate web site and relays information to the user making the ruse even more believable. It is this last aspect that is particularly distressing to banks as they do not have a good way to detect that they are dealing with an MITM node rather than directly with their customer. Because the attacker's MITM machine looks and acts just like a real end user, the MITM machine acts as a conduit for sensitive information such as userids and passwords and, potentially, for conducting transactions.

While digital certificates could provide a reasonable measure of protection in such an instance, they have thus far proven to be difficult and expensive to deploy and manage across a large end user base especially when those users may have limited technical skills and may also be highly mobile, using many different nodes to conduct transactions.

Another increasingly popular defense is to use "strong" authentication mechanisms such as security tokens, smart cards or biometrics to ensure that the end user is who they claim to be. The problem with these defenses is that in the MITM case, the digitized authentication data is simply passed directly through the intermediate node making it unnecessary for the attacker to actually possess the token, smart card or physical characteristic being measured.

Finally, another technique for alerting end users that they are being lured into logging into a bogus Web site involves the presentation of a graphical image pre-selected by the user. During login, if the user does not see the image they selected during registration (something which only they and the legitimate Web site should know), then they know to abort the authentication process. However, in an MITM case, the target Web site presents the image to the MITM node thinking it is the end user and the MITM node relays this image to the real end user leading them to believe that the attack node is legitimate.

BRIEF SUMMARY OF THE INVENTION

The present invention relates to a system, method and program product for detecting man in the middle attacks. In one embodiment, there is a system for defending against man in the middle (MITM) attacks directed at a target server, comprising: an activity recording system that records an incoming IP address, userid, and time of each session occurring with the target server; an activity analysis system that identifies suspect IP addresses by determining if an unacceptable number of sessions are occurring from a single incoming IP address during a predefined time period; and a countermeasure system for taking action against suspect IP addresses.

In a second embodiment, there is a computer program product stored on a computer readable medium, which when executed includes program instructions for defending against man in the middle (MITM) attacks directed at a target server, the program product comprising: program instructions for recording an incoming IP address, userid, and time of each session occurring with the target server; program instructions for identifying suspect IP addresses by determining if an unacceptable number of sessions are occurring from a single incoming IP address during a predefined time period; and program instructions for taking defensive action against suspect IP addresses.

In a third embodiment, there is method for defending against man in the middle (MITM) attacks directed at a target server, comprising: recording an incoming IP address, userid, and time of each session occurring with the target server; identifying suspect IP addresses by determining if an unacceptable number of sessions are occurring from a single incoming IP address during a predefined time period; and taking defensive action against suspect IP addresses.

In a fourth embodiment, there is a method for deploying a system for defending against man in the middle (MITM) attacks directed at a target server, comprising: providing a computer infrastructure being operable to: record an incoming IP address, userid, and time of each session occurring with the target server; identify suspect IP addresses by determining if an unacceptable number of sessions are occurring from a single incoming IP address during a predefined time period; and take defensive action against suspect IP addresses.

MITM attacks of the sort described herein share a detectable characteristic that can be used to predict to some reasonable certainty that an attack is taking place. Once detected, defensive action can be taken, such as sending a message that will be relayed by the MITM node to the user informing the user of the potential vulnerability and ending the session.

The observable characteristic shared by successful MITM attacks is that to the target server it will appear that a large number of different end users have for no apparent reason begun logging on from the same IP address, i.e., the address of the MITM proxy. If, for instance, certain definable thresholds were exceeded such as N number of userids from a single, previously unknown address within a specific interval of time, then further investigation or even automated defenses would be warranted.

Some advantages to this technique include: the thresholds can be tuned to suit the risk tolerance of the target organization; detection can be automated; countermeasures can be automated to limit further damage; automated detection and response allows for constant vigilance by providing a continuous, 24×7 defense; the basic technique can be extended beyond web spoofing/phishing attacks to other types of MITM scenarios; the more "successful" the attacker is at luring victims, the more likely the attack will be detected and repelled The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
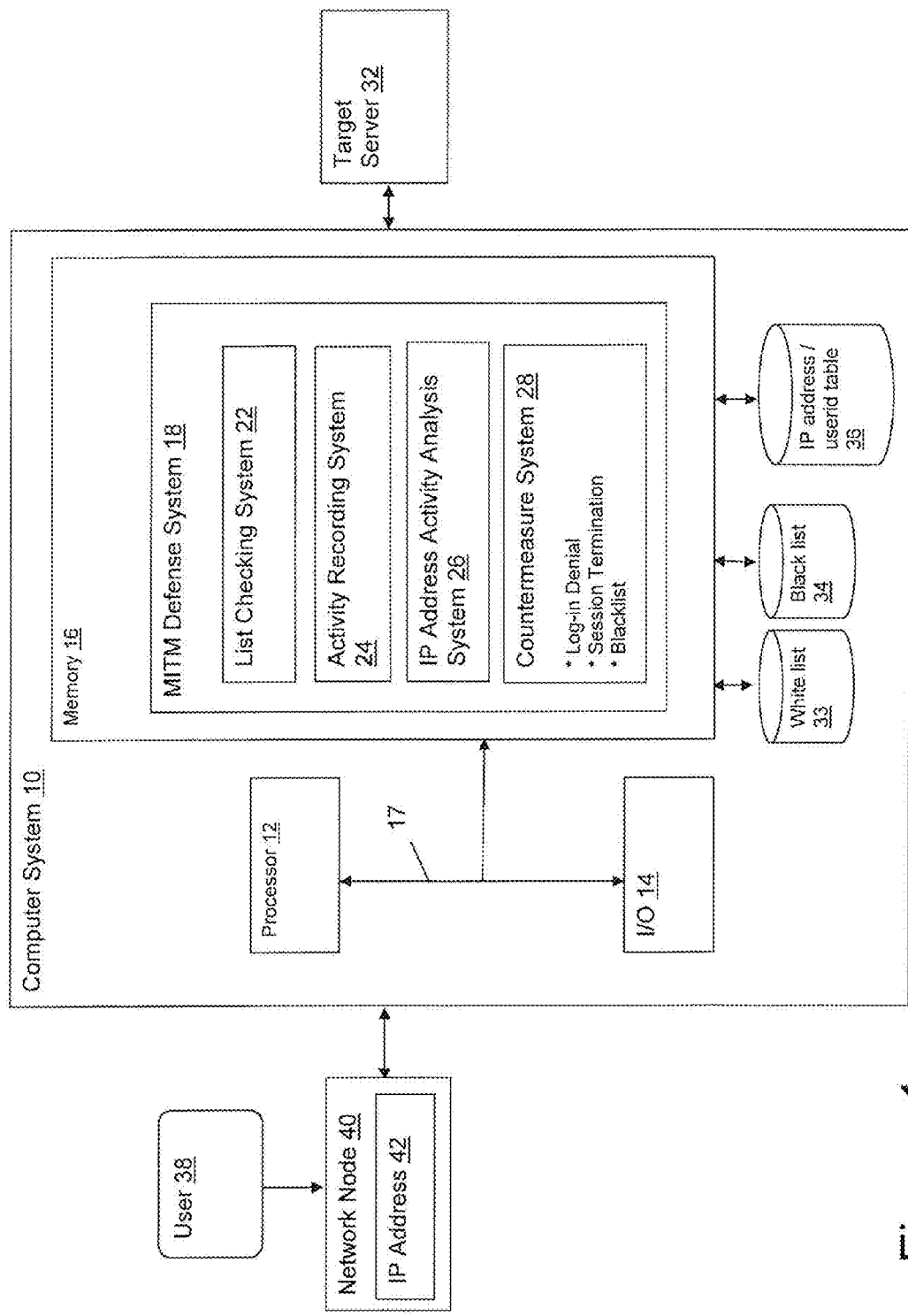
FIG. 1 depicts a computer system having an MITM defense system in accordance with an embodiment of the present invention.
Figure 2:
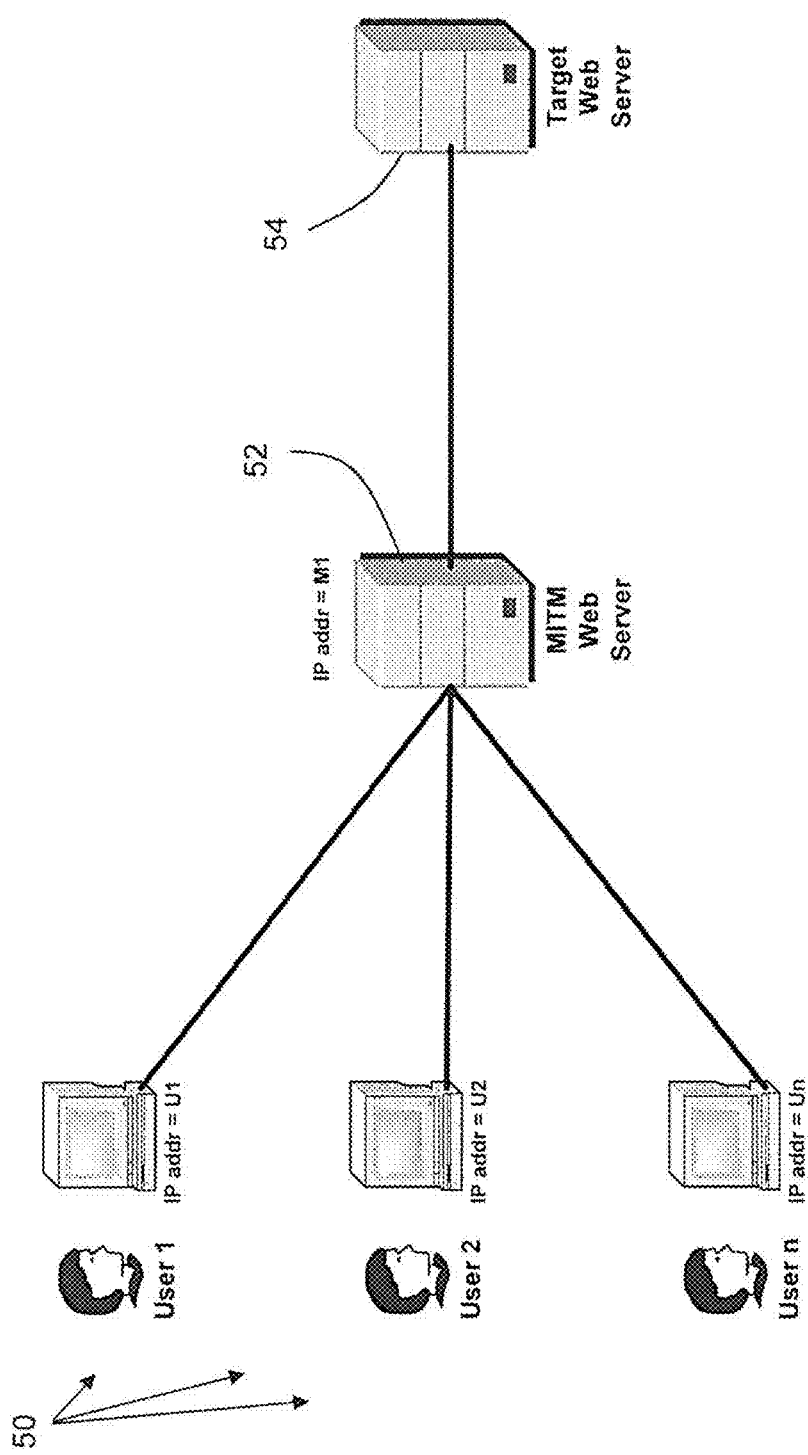
FIG. 2 depicts an example of an MITM attack.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

FIG. 1 depicts a computer system 10 that provides an MITM defense system 18 for a target server 32 communicating with a user 38 via network node 40. In particular, MITM defense system 18 analyzes the IP address 42 of network node 40 to determine whether network node 40 is a legitimate node associated with user 38 or an MITM server that has interposed itself between the user 38 and target server 32. Note that in this illustrative embodiment, computer system 10 containing MITM defense system 18 is shown separated from target server 32. However, it is understood that MITM defense system 18 may be integrated with target server 32 in a single system.

As noted above, an observable characteristic shared by successful MITM attacks is that it will appear to the target server 32 that a large number of different end users have for no apparent reason begun logging on from the same IP address 42, i.e., the address of the MITM server. While this behavior alone will not conclusively indicate malicious activity, identifying and analyzing such behavior can allow for further investigation or countermeasures to be taken. For instance, definable thresholds involving the allowed number of user IDs from a single, previously unknown address within a specific interval of time can be put in place to identify suspicious activity. When a threshold is exceeded, then further investigation or even automated defenses can be implemented.

As shown in this illustrative embodiment, MITM defense system 18 includes a list checking system 22, an activity recording system 24, an IP address activity analysis system 26, and a countermeasure system 28. List checking system 22 is utilized to compare an incoming IP address 42 with either or both a white list 33 and a black list 34. The white list 33 may include a list of known IP addresses that are valid, and need not be analyzed (e.g., the IP address associated with a known legitimate proxy, etc.). The black list 34 may include a list of known IP addresses that are invalid (e.g., sites that are known to have caused attacks in the past). When an IP address 42 is found on the black list 34, the session can, e.g., be immediately terminated.

Activity recording system 24 is utilized to store IP addresses and timing information for sessions occurring with the target server 32. This information is stored in an IP address/userid table 36, which can then be used by IP address activity analysis system 26. IP address/userid table 36 may be implemented in any format that can track userids, login time, and IP addresses.

Figure 3:
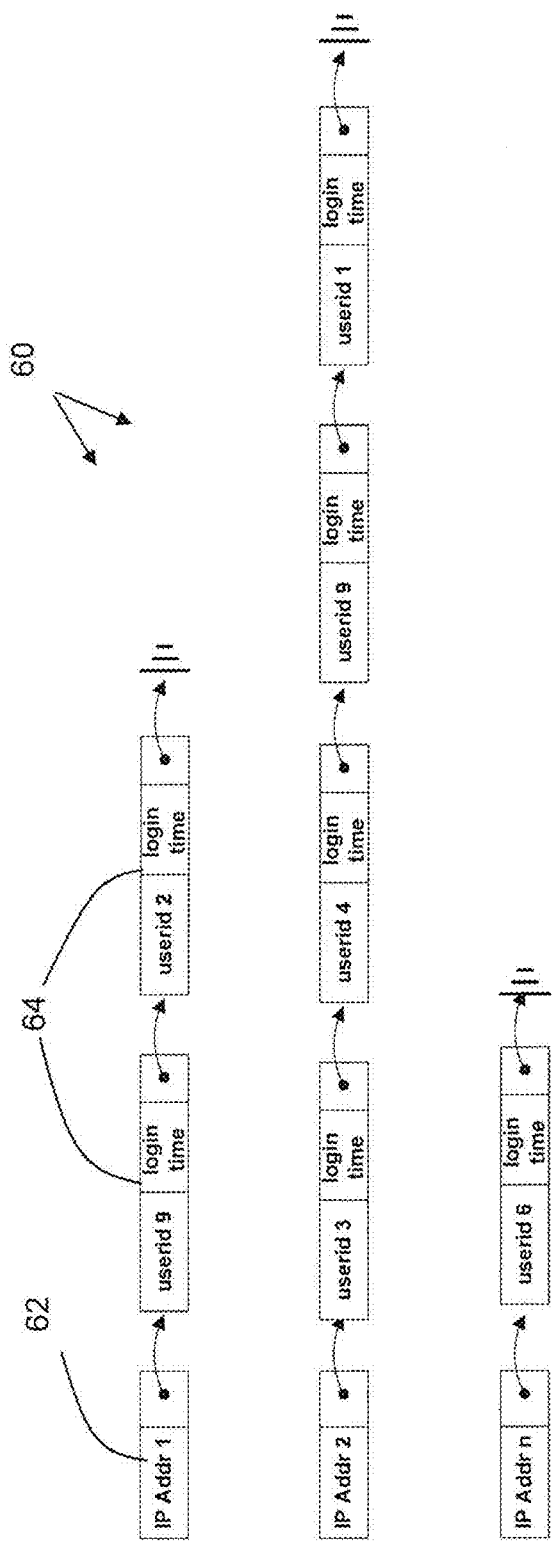
FIG. 3 depicts an example of an IP address/userid table in accordance with an embodiment of the present invention.

One possible implementation would involve a hash tree that indexes IP addresses such that each address points to a linked list of userids (and associated login times) that have logged onto the particular IP address. FIG. 3 depicts an illustrative embodiment of such an implementation involving three linked lists 60 for IP Addr 1, IP Addr 2, and IP Addr 3. As can be seen for the first IP address 62 (Addr 1), there have been two logins 64 by userid 9 and userid 2. For each login, there is an associated login time.

IP address activity analysis system 26 (FIG. 1) is utilized to examine the IP address/userid table 36 to identify any IP addresses that have an unusually large number of logins during some predefined time period. For example, threshold values may be utilized that would be customizable by the target organization based on their tolerance for risk (much like a biometric system or intrusion detection system must be tuned to minimize false positives while not overlooking real attacks). These observed values and associated thresholds could be expressed as follows:

$N$=number of userids logging in from the given IP address
$Nt$=threshold of acceptable number of userids logging in from any given IP address
$T$=time interval over which logins from a given IP address have been attempted
$Tt$=time interval threshold triggering suspicion Then, the following algorithm could be implemented:
If $N>Nt$ and $T>Tt$ then
suspect MITM attack
otherwise
proceed with login and record details.

It is understood that the above is for illustrative purposes only, and more complex algorithms could be utilized, e.g., ones that take into account time of day, past usage history, analysis of the specific userids, etc.

Countermeasure system 28 is utilized to respond to a suspected MITM attack by taking some defensive action. Any type of countermeasure could be implemented. For instance, in a case where a login is being attempted from a suspicious IP address, the login can simply be denied. In other cases, if a first session is currently underway and a large number of additional sessions are started from the same IP address, the first session could be terminated. In these cases, the suspicious IP address could be added to the black list 34. In still further cases, suspect IP address can be simply outputted to a user for further investigation.

Figure 4:
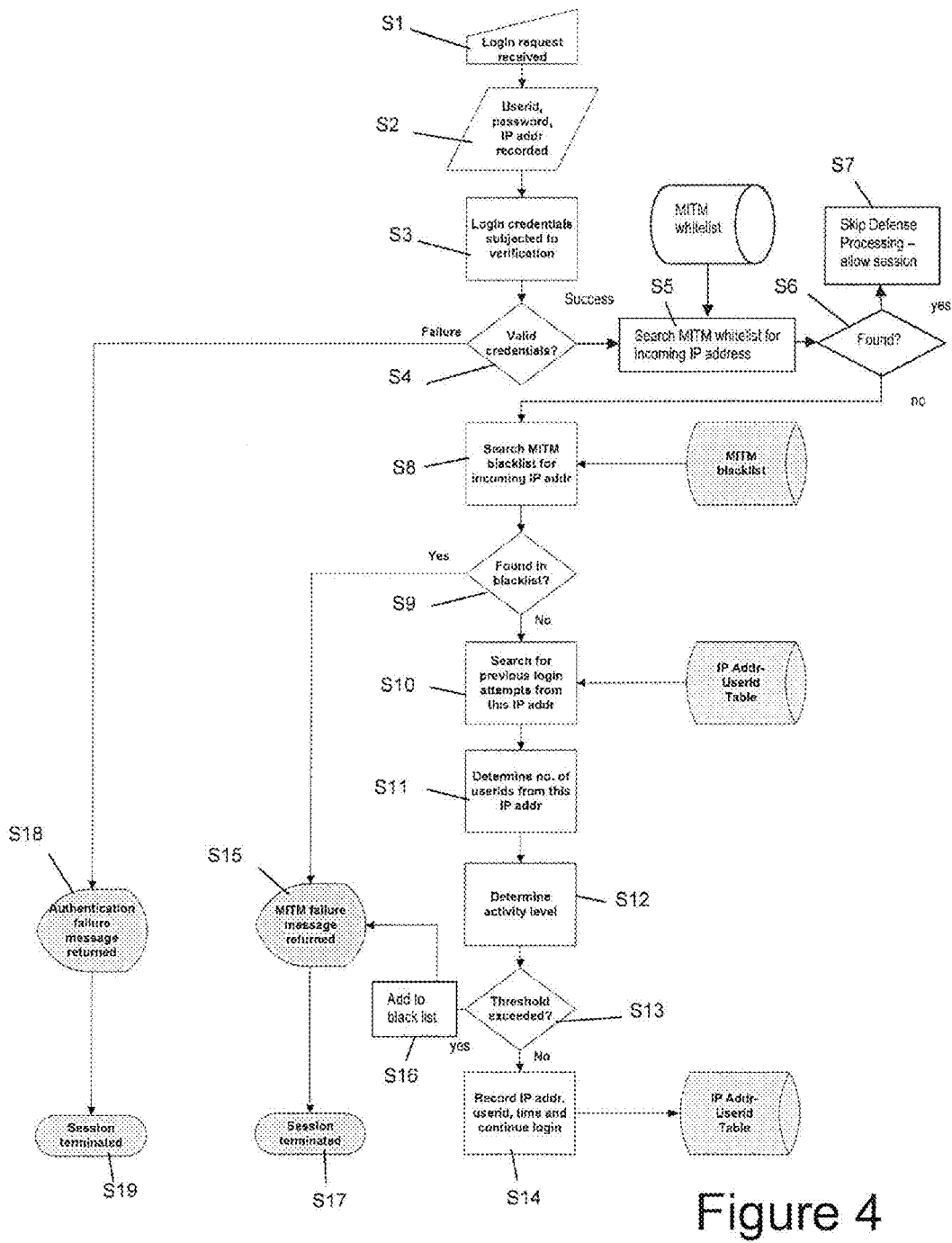
FIG. 4 depicts a flow diagram showing an illustrative implementation of an embodiment of the present invention.

FIG. 4 depicts a flow diagram of a process for implementing MITM defense system 18 (FIG. 1) for a login procedure. At S1, a login request is received and the userid, password and IP address are recorded at S2. At S3, the login credentials are subjected to verification, and if they fail, an authentication failure message is returned at S18, and the session is terminated at S19. If the login credentials succeed, then an MITM white list is searched to locate the incoming IP address at S5. If it is found at S6, then defense processing is skipped and the session is allowed to continue at S7. Otherwise, an MITM black list is searched for the incoming IP address at step S8. If the IP address is found in the black list at S9, then an MITM failure message is returned at S15, and the session is terminated at S17.

If the incoming IP address is not found in the black list, then a search is made for previous login attempts from the incoming IP address at S10. At S11, the number of userids originating from the IP address are determined, and the activity level is determined at S12 (e.g., how many during a particular time period). At S13, the number and activity level are compared against threshold values, and if exceeded, the IP address is added to the black list at S16, an MITM failure message is returned at S15, and the session is terminated at S17. If the threshold values are not exceeded, then at S14, the IP address, userid, and time are recorded in the IP address userid table, and the login continues.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a MITM defense system 18 could be created, maintained and/or deployed by a service provider that offers the functions described herein for customers. That is, a service provider could offer to deploy or provide the ability to identify and respond to MITM attacks as described above.

It is understood that in addition to being implemented as a system and method, the features may be provided as a program product stored on a computer-readable medium, which when executed, enables computer system 10 to provide an MITM defense system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system comprising:
at least one computing device configured to defend against man in the middle (MITM) attacks directed at a target server, the at least computing device comprising:

an activity recording system that records an incoming IP
address, user id, and
time of each session occurring with the target server;
a list checking system for performing the following:
comparing a single incoming IP address with a white
list; and
comparing the single incoming IP address with a
black list after
the comparing of the single incoming IP address with the
white list and after determining that the single incoming IP address is not present on the white list;
an activity analysis system that performs the following
after the list checking system compares the single
incoming IP address with the black list, and after determining that the single incoming IP address is not present
on the black list:
searches for records of a previous login attempt from the
single incoming IP address;
determines a number of user ids occurring from the
single incoming IP address during a predefined time
period;
compares the number of user ids occurring from the
single incoming IP address to a predefined threshold
number of user ids specific to the predefined time
period; and
identifies the single incoming IP address as a suspect IP
address in response to the number of user ids occurring from the single incoming IP address exceeding
the threshold within the predefined time period; and
a countermeasure system for taking action against the suspect IP address.

2. The system of claim 1, wherein the activity analysis system includes a first value N that represents a number of sessions along with a threshold value Nt and a second value T and its associated threshold value Tt that represents a time frame, and wherein if there are more than N sessions with the single incoming IP address during a time period less than T, the single incoming IP address is identified as a suspect IP address.

3. The system of claim 1, wherein the countermeasure system causes a login session to fail.

4. The system of claim 1, wherein the countermeasure system causes a session to terminate in response to the identifying of the single incoming IP address as a suspect address.

5. The system of claim 1, wherein the countermeasure system causes the suspect IP address to be outputted.

6. A computer program product stored on a non-transitory computer readable medium, which when executed includes program instructions for defending against man in the middle (MITM) attacks directed at a target server, the program product comprising:
program instructions for recording an incoming IP address, user id, and time of each session occurring with the target server;
program instructions for comparing the incoming IP address with a white list;
program instructions for comparing the incoming IP address with a black list after the comparing of the incoming IP address with the white list and after determining that the incoming IP address is not present on the white list;
program instructions for searching for records of a previous login attempt from the incoming IP address;
program instructions for identifying suspect IP addresses by determining a number of user ids occurring from the single incoming IP address during a predefined time period after the comparing of the incoming IP address with the black list, and after determining that the single incoming IP address is not present on the black list;
program instructions for comparing the number of user ids occurring from the single incoming IP address to a predefined threshold number of user ids specific to the predefined time period;
program instructions for identifying the single incoming IP address as a suspect IP address in response to the number of user ids occurring from the single incoming IP address exceeding the threshold within the predefined time period; and
program instructions for taking defensive action against the suspect IP address.

7. The program product of claim 6, wherein a first value N represents a number of sessions along with a threshold value Nt and a second value T and its associated threshold value Tt represents a time frame, and wherein if there are more than N sessions with the single incoming IP address during a time period less than T, the single incoming IP address is identified as a suspect IP address.

8. The program product of claim 6, wherein the defensive action causes a login session to fail.

9. The program product of claim 6, wherein the defensive action causes a session to terminate in response to the identifying of the single incoming IP address as a suspect address.

10. The program product of claim 6, wherein the defensive action causes the suspect IP address to be outputted.

11. A computer-implemented method performed on at least one computing device for defending against man in the middle (MITM) attacks directed at a target server, the method comprising:
recording an incoming IP address, user id, and time of each session occurring with the target server using the at least one computing device;
comparing the incoming IP address with a white list;
comparing the incoming IP address with a black list after the comparing of the incoming IP address with the white list and after determining that the incoming IP address is not present on the white list;
searching for records of a previous login attempt from the incoming IP address;
identifying suspect IP addresses by determining a number of user ids occurring from the single incoming IP address during a predefined time period after the comparing of the incoming IP address with the black list, and after determining that the single incoming IP address is not present on the black list;
comparing the number of user ids occurring from the single incoming IP address to a predefined threshold number of user ids specific to the predefined time period;
identifying the single incoming IP address as a suspect IP address in response to the number of user ids occurring from the single incoming IP address exceeding the threshold within the predefined time period; and
taking defensive action against the suspect IP address using the at least one computing device.

12. The method of claim 11, wherein a first value N represents a number of sessions along with a threshold value Nt and a second value T and its associated threshold value Tt represents a time frame, and wherein if there are more than N sessions with the single incoming IP address during a time period less than T, the single incoming IP address is identified as a suspect IP address.

13. The method of claim 11, wherein the defensive action causes a login session to fail.

14. The method of claim 11, wherein the defensive action causes a session to terminate in response to the identifying of the single incoming IP address as a suspect address.

15. The method of claim 11, wherein the defensive action causes the suspect IP address to be outputted.

16. A computer-implemented method for deploying a system for defending against man in the middle (MITM) attacks directed at a target server, comprising:
  providing at least one computing device being operable to:
    record an incoming IP address, user id, and time of each session occurring with the target server;
    compare the incoming IP address with a white list;
    compare the incoming IP address with a black list after the comparing of the incoming IP address with the white list and after determining that the incoming IP address is not present on the white list;
    search for records of a previous login attempt from the incoming IP address;
    identify suspect IP addresses by determining a number of user ids occurring from the incoming IP address during a predefined time period after the comparing of the incoming IP address with the black list, and after determining that the single incoming IP address is not present on the black list;
    compare the number of user ids occurring from the single incoming IP address to a predefined threshold number of user ids specific to the predefined time period;
    identify the single incoming IP address as a suspect IP address in response to the number of user ids occurring from the single incoming IP address exceeding the threshold within the predefined time period; and
    take defensive action against the suspect IP address.

17. The method of claim 1, wherein the activity recording system records the incoming IP address, the user id, and the time of each session occurring with the target server in a hash tree that indexes the incoming IP address with the user id and the time of each session.

18. The method of claim 17, wherein the activity analysis system searches for the records of the previous login attempt from the single incoming IP address and determines the number of user ids occurring from the single incoming IP address using the hash tree.

19. The computer program product of claim 6, wherein the incoming IP address, the user id, and the time of each session occurring with the target server are recorded in a hash tree that indexes the incoming IP address with the user id and the time of each session.

20. The computer program product of claim 19, wherein the program instructions for identifying suspect IP addresses determines the number of user ids occurring from the single incoming IP address during the predefined time period using the hash tree.

21. The computer implemented method of claim 11, wherein the incoming IP address, the user id, and the time of each session occurring with the target server are recorded in a hash tree that indexes the incoming IP address with the user id and the time of each session.

22. The computer implemented method of claim 21, wherein the identifying of suspect IP addresses determines the number of user ids occurring from the single incoming IP address during the predefined time period using the hash tree.

* * * * *